Nov. 16, 1937. C. W. WOODS 2,099,287
METHOD OF SOFTENING WATER
Filed Oct. 24, 1932
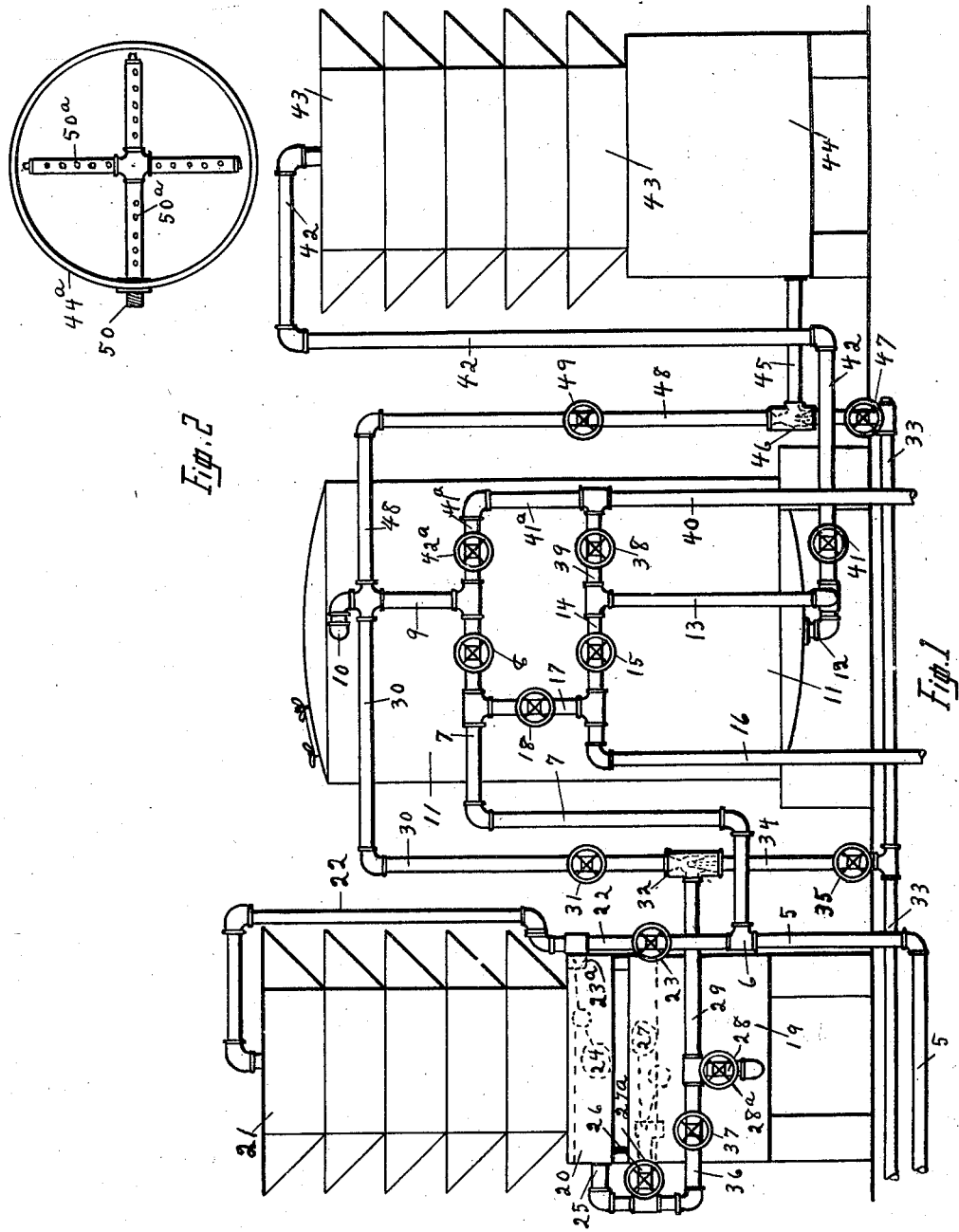
INVENTOR.
CLAYTON W. WOODS
BY
ATTORNEY Patented Nov. 16, 1937

2,099,287

UNITED STATES PATENT OFFICE 2,099,287

METHOD OF SOFTENING WATER

Clayton W. Woods, Burbank, Calif.

Application October 24, 1932, Serial No. 639,206

7 Claims. (Cl. 23—112)

This invention relates to methods of softening water.

It is well known that some so-called hard waters are unsuited for general use because of the presence therein of salts of such minerals as calcium and magnesium, and that these waters may be made suitable for such use, or softened, by the removal of said hardening salts. It is also well known that this may be accomplished by passing the hard water through certain mineral substances, such as zeolites. In recent years, the business of softening water and of providing apparatus therefor has become of considerable commercial importance.

In the apparatus generally employed there is a tank, which may be considered a filter, and which may be either open or closed at its top. Within the lower part of this tank is a bed of gravel which supports a mass of zeolites. These zeolites, having first been activated by treatment with a solution of common salt (sodium chloride), and thus charged with sodium, are in condition to exchange their sodium content for the calcium and magnesium content of the hard water; and when the latter is passed or filtered through them this base exchange takes place and the hard water is softened. This exchange rapidly depletes the sodium charge of the zeolites and loads the latter with the calcium and magnesium salts, with the result that the zeolites lose their ability to soften the water. Consequently, they require regeneration before they can again be efficient. This regeneration is effected by cutting off the flow of the hard water and in then passing a strong solution of sodium chloride through the zeolites, either in the same direction as the previous flow of the hard water or in the reverse direction.

A strong solution of sodium chloride is necessary for regeneration of the zeolites for the reason that the normal reaction of the zeolites is to pick up calcium and magnesium and to pass off sodium. In order to reverse this exchange, an excess of sodium chloride must be present, the normal amount required being substantially 3400 grains (½ pound) per each 1000 grains of hardness in terms of calcium carbonate to be removed from the water. This means that approximately three units per weight of regenerating salt have been used for the removal of one unit per weight of the hardening salts. Thus, much more sodium chloride has been used to effect complete regeneration than is actually necessary, as will hereinafter be shown.

One object of my invention is to reduce the amount of sodium chloride employed by recovering a portion of the brine which has been passed through the zeolites. This recovered brine is passed through the zeolites as the first brine in the next regeneration. Having then been twice used in regeneration, it is generally so contaminated with the hardening salts as to be unfit for further use, and so is allowed to waste. After the zeolites have been treated with this brine which has been recovered from the previous regeneration, they are given a short fresh-water wash to carry away the excess calcium and magnesium which have been freed by the sodium of the brine but which remain in the zeolites. Then the latter are further regenerated by passing through them a pure or fresh sodium-chloride solution. The main portion of this brine which is used after the short fresh-water rinse is the part which is recovered for use in the first step of the succeeding regeneration. The complete regeneration comprises, therefore, first, the use of this recovered brine; second, the short, fresh-water wash; and, third, the pure sodium-chloride brine, which is recovered for use in the first step of the succeeding regeneration. This recovered brine is not contaminated with an excess amount of calcium and magnesium and is, therefore, suitable for use once more, but in the first part of the succeeding regeneration, as stated. By means of a salt-water hydrometer, the specific gravity of the liquid passing from the filter may be tested to determine when the contaminated brine has passed out of the zeolites to waste and also to determine when the fresh brine has passed through the zeolites and is in condition for recovery.

In the early practice of water-softening, the particles of the softening material were relatively coarse, being of approximately the size of buckshot. Relatively large voids or interstices were left between the particles, and the total surface exposed for action upon the water was correspondingly limited. Consequently, the softening action was slow, as was also the regeneration. In those days it was considered advisable, if not absolutely necessary, to flow the brine in the reverse direction from that of the flow of the hard water. Then the size of the particles of the softening materials was much reduced, until they now average little if any greater than the head of an ordinary pin. This has had the effect of compacting the mass, largely filling up the voids and greatly increasing the total active surface of the materials. As a result, both the softening and regenerating operations are greatly accelerated, it now requiring but from two and a half to three hours to accomplish what previously had required from eight to ten hours. As a further result and due to the denser bed of the softening materials, the water and brine, assuming the same pressure as before, percolate through more slowly and it has become practical to pass both of them through in the same direction, which is the practice I now prefer.

At the beginning of a run of hard water, the zeolites, having been activated or regenerated, those particles which first contact the water give up their sodium content and take up the calcium and magnesium content of the water, becoming thus contaminated. This contaminating action proceeds progressively more and more deeply into the bed of zeolites until finally regeneration has become necessary. In the same way, the regenerating brine first acts upon the particles which it first contacts which, in case it be flowed in the same direction as the hard water, are the same particles as were first contaminated in the softening operation. The brine acts progressively more and more deeply into the bed until finally all the particles have freed their hardening content. However, not all of the hardening salts have been washed out at the time the base exchange has been completed. This could be effected by continuing the flow of the brine, as is the usual practice; but that would result in a serious waste of brine and of the sodium chloride it contains, since all of this part of the brine is wasted. It can be accomplished just as well by fresh water; and for that reason and to effect that saving, I give the zeolites the fresh-water wash after the recovered brine has been passed therethrough and before the fresh and pure brine is applied.

At the time the fresh-water wash is introduced, therefore, the actual regeneration is almost complete, although substantial amounts of the hardening salts remain in the bed to be carried out by the fresh water. This means that the regeneration has been mostly effected by the use of the recovered brine; and that means that the said recovered brine possesses the strength necessary to accomplish that result. As a matter of fact, the fresh, pure brine takes up such a small amount of the hardening salts and gives up so little of its sodium chloride in exchange that it is but slightly contaminated and is almost as strong as it was before it contacted with the zeolites. That is to say, the recovered brine has almost the same strength as the fresh, pure brine and is almost of the same purity. It is important that the regenerative power of the recovered brine be nearly the same as the regenerative power of the fresh brine, since it must have sufficient sodium chloride in it to carry through the entire bed of zeolites and effect the base exchange, as hereinbefore described. As will be seen, therefore, I effect a saving of salt by the recovery of the brine after the fresh-water and also by the use of the fresh-water wash which carries away the freed but lingering particles of the hardening salts.

In softening water, the normal action is for the zeolites to raise the pH value of the water slightly, so that the softened water carries a higher pH value than the hard water. As is well understood, a liquid which is perfectly neutral, such as chemically pure distilled water, has a pH value of 7. If it has a lower pH value, it is acid, whereas if its pH value is greater than 7, it is alkaline. To be efficient as a regenerating agent, the brine must be alkaline and should have a pH value somewhere above 7. I have found a value of 7.4 to give very satisfactory results.

Some waters are naturally alkaline, and if they be used in making up the brine, special treatment may not be necessary to maintain the pH value of the brine sufficiently high. When, however, the brine water is acid, something must be done to raise its pH value, else the softening operation will be inefficient. Therefore, one of the objects of my invention is to insure the efficiency of a water-softening system by seeing to it that the brine used for regenerating the zeolites is alkaline. This object is preferably attained by aeration; and, as will hereinafter be more fully set forth, I prefer to aerate both the water which is to be used in making up the brine in the first instance and, later, to aerate that part of the brine which has been recovered for the next regeneration.

To improve the alkalinity, or to raise the pH value, of a brine something must be done to the water, since the sodium chloride is a neutral salt and will not affect either the acidity or the alkalinity of the solution. The use of chemical means for increasing the pH value of the recovered brine, which always carries some calcium and magnesium chlorides, is not practicable because the chemicals employed either precipitate the calcium and magnesium or increase the hardness of the recovered brine, depending on the chemical used; and, in either case, a brine thus treated would be unsuited for use in the softener. Then, the addition of any strong alkali to the brine which would remain even as a trace in the zeolites and later be passed out with the softened water, would be objectionable for many uses and in many cases prohibitive. If the softened water be used for drinking purposes, for example, the presence therein of some alkalis would be objectionable from the standpoint of health. Moreover, many municipalities now soften their entire water supply, and the means employed for raising the pH value of the regenerating brine must be inexpensive in its installation, maintenance and operation.

According to the modern theory of electrolytic dissociation, all liquids of which water is a constituent contain free H and OH ions. If the H ions predominate, the liquid is acid and if the OH ions predominate the liquid is alkaline. If, therefore, the water which is used in making up the brine for regenerating the zeolites contains an excess of free H ions, or if it fails to contain a predominating amount of the OH ions, it is undesirable for use in making up the brine and its use in a softening system would gradually result in rendering the latter inefficient if, indeed, it would not render it practically inoperative.

As stated, the normal action in softening water is for the zeolites to raise the pH value of the water slightly, so that the softened water carries a higher pH value than the hard water. At the same time, a slight hydrogen ion concentration takes place in the zeolites, which is neutralized at the time of regeneration. After the brine has passed through the zeolites the pH value of the recoverable brine is usually on the acid side, or nearly so, depending upon the alkalinity of the brine when first prepared. If this recoverable brine be again introduced into the zeolites without first raising its pH value to or above 7, the hydrogen ion concentration in the zeolites will not be sufficiently neutralized but it will increase and will cause the zeolites gradually to lose their efficiency. Aeration is the preferred method for increasing the pH value of the recovered brine to 7 or above. This may be, and preferably is in most cases, accomplished by causing the recovered brine, or the water which is to be used in making up the brine, to pass in thin sheets or in fine streams—or in a spray—through air so that the oxygen in the air may contact with every small particle of the brine or water. In some cases where compressed air, or oxygen or ozone or some gas which contains free oxygen is available, it may be used in raising the pH value of the brine or water. As will be seen, I prefer to aerate the water which is used in the fresh-water wash after regeneration with the recovered brine.

The method of water softening above set forth may be carried out by the use of apparatus which may be varied in details in different plants. The accompanying drawing shows a suitable apparatus and the one which is, at present, preferred. However, it is to be understood that the accompanying claims are not intended to be limited to the details shown any further than their specific terms require. While but a single unit of apparatus is shown, it will be understood that a plant may require a multiple of such or similar units, and that such a plant is within the scope of my invention.

In the drawing, Fig. 1 is a diagrammatic view of an apparatus suitable for carrying out my invention and Fig. 2 is a plan view of a modified form of aerating device, the same being adapted for use of compressed air or oxygen or ozone.

The water which is to be softened is introduced through the pipe 5, which is branched at 6, one branch, 7, leading, through a valve 8, pipe 9 and suitable fittings, to the inlet 10 of the tank or filter 11. This filter may be of any suitable form and construction, but it is preferably cylindrical with closed ends, as indicated. Within the filter, at the lower part thereof, is a bed of gravel upon which the zeolites are supported. The specific nature of the filter and of its contents form no part of my present invention, and fuller description and illustration thereof is deemed unnecessary. The water to be softened passes downwardly through the filter from the inlet 10 to the bottom and out through a suitable outlet 12. Thence it passes upwardly through pipes 13 and 14 and valve 15 to the outlet pipe 16, which leads to points where the water is used. The water is presumably under sufficient pressure to cause it to flow in the manner stated. If preferred for any reasons, either the water or the brine may be caused to flow in the reverse direction, entering the filter tank at 12 and passing out therefrom at 10. The pipes 7 and 14 are connected together through a pipe 17 and valve 18, in order that the water may be diverted from or short-circuited about the filter.

At 19, there is shown a brine-tank in which there is normally maintained a quantity of undissolved salt (sodium chloride). However, the apparatus is adapted to the batch method also, in which only such a quantity of salt is placed in the tank 19 as will be fully dissolved by the water therein or passing therethrough. Above the brine-tank is a receptacle 20 and, above it, is an aerator 21 of any suitable type. From the point 6 in the water pipe 5, another branch pipe, 22, leads upwardly and extends over the aerator 21 in position to deliver water thereto. The pipe 22 is provided with a shut-off valve 23 and with a valve 23a, which is automatically controlled by a float 24 within the receptacle 20 and by means of which the water in the receptacle may be retained at a desired level. As will be understood, the water from the pipe 22 is caused to flow downwardly by gravity through the aerator and is broken up into small particles so as to be thoroughly exposed to the air. This is for the purpose of raising the pH value of the water, as has been explained. While the aerator 21 and its receptacle 20 are preferably located directly above the brine-tank 19, as shown, they may be placed elsewhere so long as they are at a higher level than said tank. Of course, they may be placed at the same level as, or even lower than, the brine-tank and the water pumped into the latter, but I much prefer the gravity flow and the arrangement shown. The receptacle 20 is connected with the brine-tank through pipes 25 and 26, the latter pipe entering the tank and having a float-controlled valve 27 to shut off the water automatically when the desired amount has entered the tank. The pipe 26 is further provided with a manually controlled valve 27a for shutting off the water flowing into the tank.

The brine from the tank 19 is used for regenerating the zeolites, and it is connected to the inlet 10 of the filter through a series of pipes 28, 29 and 30. The pipe 28 is provided with a shut-off valve 28a, while a valve 31 in the pipe 30 opens and closes the brine passage. The brine is propelled in any suitable manner, but preferably by means of an ejector 32 at the juncture of the pipes 29 and 30. The structure of this ejector, which is of a conventional type, is indicated in dotted lines, and the same is operated by a jet of steam, as will be understood. Obviously, the brine could be forced into the filter by a pump if preferred. The steam is supplied from a pipe 33 having a branch 34 with a control valve 35. The pipes 25 and 29 are connected through a pipe 36 having a valve 37 therein, for a purpose hereinafter explained.

Before the first brine is introduced at the beginning of the regenerating operation, the valves 8 and 15 are closed to shut off the water from the pipe 5. Then a valve 38 in a pipe 39 is opened, which pipe is connected with the pipe 13 from the outlet 12 of the filter and with a waste pipe 40. The brine first used, which is that recovered from the previous regeneration, is thus allowed to pass through the pipes 13 and 39, valve 38 and waste-pipe 40 to a sewer or sump. The fresh-water wash is the next step in order, and the water for that purpose comes from the receptacle 20 of the aerator 21. To this end, the valve 28a is closed and the valves 31 and 35 are opened, the latter admitting steam to the ejector to force the aerated water through the filter. At the same time, the valve 23 is preferably open to furnish all the water needed for the fresh-water wash and to refill the receptacle to its normal level. The water passing through the filter washes out the freed but lingering parts of the hardening salts, carries them to waste through the pipes 13, 39, and 40, and, at the same time, fills the filter tank. Having first been aerated, this water has a relatively high pH value and is thus in condition to assist in overcoming any acid condition in the filter. When, by hydrometer test, it is determined that the waste water passing through the pipe 40 carries substantially none of the hardening salts, the time has arrived for applying the fresh brine from the tank 19. As will be noted, the pipe 28 leads from the lower part of the tank where the brine is naturally strongest and nearly or quite saturated. It may be desired to weaken this brine somewhat and this can be done and nicely controlled by opening more or less the valve 37. Then, when the steam is turned on at valve 35 and the valve 31 is opened, the brine in the tank 19 is drawn out, is forced into the filter, displacing the aerated water therein and forcing it to the waste pipe. If the brine be stronger than necessary, it may be cut in strength by permitting some aerated water to pass through the valve 37, thus to dilute the brine.

When the hydrometer tests show that the fresh brine has substantially displaced the wash water and has the proper specific gravity, the brine is in condition for recovery for the next regeneration. The valve 35 is accordingly closed and a valve 41 in a pipe 42 is opened. This pipe connects with the outlet 12 and leads to the top of an aerator 43 which, as shown, is preferably placed directly over the tank 44 for the recovered brine. This aerator may be of the same structure as the aerator 21, but it preferably discharges directly into the tank 44.

As stated, the brine recovered in the tank 44 is used at the beginning of the next regeneration. It is drawn out through a pipe 45 by means of an ejector 46 which is supplied with steam from the pipe 33 through a valve 47, and is forced to the inlet 10 of the filter through a pipe 48 which is provided with a shut-off valve 49.

By using ejectors operated by steam, I am enabled to propel the brines without materially diluting them, as would be an objectionable result in some cases if water ejectors were used. As stated, however, force pumps may be employed in place of the ejectors.

The operation may be summarized as follows: Assuming that the zeolites have been activated or regenerated, the valves 8 and 15 are opened to admit the water to the filter at the inlet 10 and to permit it to flow outwardly through the pipes 13, 14 and 16 to the places for use. The zeolites collect the calcium and magnesium in the water and give off their sodium, thus becoming exhausted of their sodium content and charged with calcium and magnesium. They now require regeneration, and this is effected by the brines from the tanks 44 and 19. The brine in the tank 44, which has been recovered as described, is first employed. Then the aerated fresh water from the receptacle 20 is sent through the filter to remove the lingering traces of freed hardening salts and to improve the pH value of the contents of the filter, and then the fresh and pure brine from the tank 19 is employed and the main part thereof is recovered in the tank 44 for the next regeneration, the recovered brine having been aerated and its pH value raised by the aerator 43. When the operation of brining and the regeneration is complete, the zeolites are in condition for softening the hard water from the pipe 5. The softening of the water again contaminates the zeolites and necessitates a further regeneration, so that the steps set forth are repeated indefinitely. As will be understood, the first part of the softened water must be wasted since it will be mixed with the brine which it forces from the filter.

The apparatus is sometimes installed in places where there is a supply of air under pressure. In these installations it is practicable to aerate the brine in the tank 44 with this compressed air, and this air may also be used for aerating the water for making up the brine in the tank 19. In Fig. 2, I have shown a brine tank 44a, corresponding to the tank 44, to which an air pipe 50 is attached, said pipe leading to the central axis of the tank where it is branched, as shown at 50a. The branch pipes within the tank are perforated to permit the air to bubble up through the brine, thus to aerate it.

I claim:

1. In the art of water softening in which successive runs of hard water through zeolites are alternated with regenerations of said zeolites, the method of regeneration which comprises passing a sodium chloride solution of one strength through the zeolites until the greater part of the hardening substances extracted from the water has been set free, then washing said zeolites with fresh water until the effluent water from the zeolites contains substantially none of the said freed hardening substances, then completing the regeneration by the application of a second sodium chloride solution, the fresh water wash thus serving effectually to separate the two regenerating solutions and to prevent their intermingling, recovering a part of the last-mentioned solution and raising its pH value by aeration to prepare it for use as the first regenerating solution in a succeeding regeneration.

2. The method as set forth in claim 1 in which the second solution is a brine comprising sodium chloride dissolved in aerated water.

3. The method as set forth in claim 1 in which the fresh water used for washing the zeolites is aerated before such use.

4. The method as set forth in claim 1 in which the water used in making up the second solution referred to, the water used in the fresh water wash and the recovered regenerating solution are all aerated before they are passed through the zeolites.

5. In the art of water softening in which successive runs of hard water through zeolites are alternated with regenerations of said zeolites by bringing a sodium chloride regenerating solution into intimate contact with the zeolites whereby a base exchange is effected and the pH value of said solution is lowered, recovering a portion of said solution, aerating such recovered portion to raise its pH value and thus further use in a subsequent regeneration.

6. In the regeneration of zeolites, the process comprising recovering and storing a salt solution which has been used in the later stages of an earlier regeneration, aerating said solution, running the aerated stored recovered salt solution through the exhausted zeolites to partially recondition the zeolites, and subsequently passing a further quantity of salt solution through the zeolites to complete their regeneration.

7. In the regeneration of zeolites, the process comprising recovering and storing a salt solution which has been used in the later stages of an earlier regeneration, first aerating and then running the aerated stored recovered salt solution through the exhausted zeolites to partially recondition the zeolites, then running fresh water through the partially reconditioned zeolites and thereafter running fresh salt solution through the partially reconditioned zeolites.

CLAYTON W. WOODS.

CERTIFICATE OF CORRECTION.

Patent No. 2,099,287.  November 16, 1937.

CLAYTON W. WOODS.

It is hereby certified that error appears in the printed specification of the above numbered patent requiring correction as follows: Page 4, second column, line 51, claim 5, after the word "thus" insert fit it for; and that the said Letters Patent should be read with this correction therein that the same may conform to the record of the case in the Patent Office.

Signed and sealed this 14th day of June, A. D. 1938.

(Seal)

Henry Van Arsdale,
Acting Commissioner of Patents.